Figure 1:
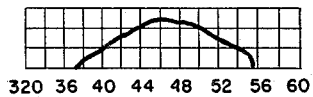

March 29, 1949.   C. D. WILSON   2,465,774
SENSITIZING DYES
Filed Nov. 8, 1946

320 36 40 44 48 52 56 60

SILVER BROMIDE EMULSION
CONTAINING DYE OF EXAMPLE II.

320 36 40 44 48 52 56 60

SILVER CHLORIDE EMULSION
CONTAINING DYE OF EXAMPLE II.

INVENTOR.
CYRIL D. WILSON
BY
Lynn Barratt Morris
ATTORNEY

Patented Mar. 29, 1949

2,465,774

UNITED STATES PATENT OFFICE 2,465,774

SENSITIZING DYES

Cyril D. Wilson, Metuchen, N. J., assignor to E. I. du Pont de Nemours & Company, Wilmington, Del., a corporation of Delaware Application November 8, 1946, Serial No. 708,743

10 Claims. (Cl. 260—240)

This invention relates to novel cyanine dyes wherein a complete cyanine dye nucleus occurs two or more times throughout the molecule. More particularly, it relates to hydrocarbon-bis-cyanine dyes of polymeric structure. It also pertains to the dye condensation of a hydrocarbon-bis-heterocyclic nitrogen salt having a reactive methyl group in the alpha or gamma position to the respective nitrogen atoms of the salt groups with a different hydrocarbon-bis-heterocyclic nitrogen salt having a reactive hydrocarbon mercapto or halogen group in the alpha or gamma position to the cyclic nitrogen atom. The invention, in addition, relates to processes of preparing such dyes, to photographic emulsions, and processes of photography utilizing such dyes.

One of the objects of this invention is to provide a new class of sensitizing dyes. A further object is to provide new means for sensitizing photographic emulsions. A still further object is to provide substitute materials for conferring an extra range of sensitivity to silver halide emulsions. Another object is to provide a new class of photographic sensitizing dyes which can be used in processes of color photography. Yet another object is to provide a new class of cyanine dyes which contain more than one cyanine dye nucleus in the molecule. A further object is to provide a new class of polymeric sensitizing dyes. A still further object is to provide practical methods for preparing such dyes. Still further objects will be apparent from the following description of the invention.

It has been found that a new class of polymeric cyanine dyes having recurring cyanine dye nuclei can be prepared by condensing a hydrocarbon-bis-heterocyclic quaternary nitrogen salt which contains a reactive methyl group in one of the positions alpha and gamma to the heterocyclic nitrogen atoms with a hydrocarbon-bis-heterocyclic quaternary nitrogen salt which contains a reactive halogen atom or a reactive hydrocarbon mercapto group, e. g., alkyl mercapto and aryl mercapto groups, in one of the positions alpha and gamma to the heterocyclic nitrogen atoms. The proportions of the two reactants can be varied but they are preferably used in equimolecular proportions. When the heterocyclic nuclei of the two salts are the same, the recurring cyanine dye nuclei are symmetric in structure but when different are unsymmetrical in structure.

The exact chemical structure of the polymers is not known with certainty. They may possess a cyclic or chain structure. When of a chain structure, the ends of the chain may consist of the unreacted methyl or hydrocarbon-mercapto or halogen substituted heterocyclic nitrogen nuclei of the original bis salt which has reacted mono-functionally. The cyclic and chain type polymers could have the formula:

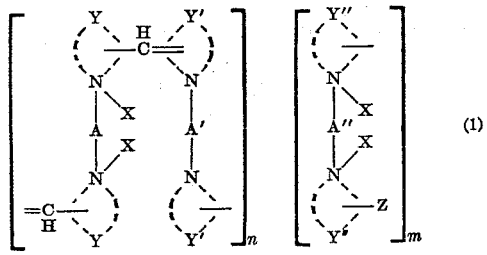

wherein A, A' and A'' are bivalent hydrocarbon radicals joined to the N atoms as shown through aliphatic carbon and may be the same or different; Y, Y' and Y'' constitute the atoms necessary to complete a heterocyclic nitrogen nucleus of the type contained in cyanine dyes, Y and Y' may be the same or different and Y'' must be either Y or Y'; X is an acid radical; Z is reactive methyl or hydrocarbon mercapto group or a reactive halogen atom; $n$ is a positive integer 1, 2, 3, etc., and $m$ is 0 or 2.

The condensation reactions take place over a wide range of temperature. The reactions will take place in the presence of a basic condensing agent upon admixing the components in a solvent or diluent medium and allowing the admixture to stand. The condensation, however, is more rapid at elevated temperatures and may be advantageously carried out under reflux conditions using a solvent and acid binding agent or an acid binding solvent, e. g., an organic amine.

The hydrocarbon-bis-heterocyclic quaternary nitrogen salts can be made after the manner set forth in application Serial Number 409,433 filed September 3, 1941, now U. S. Patent 2,425,772, of which this application is a continuation-in-part. They may also be designated as hydrocarbon-bis-cyclammonium salts. It comprises reacting a heterocyclic nitrogen base containing in the alpha or gamma position to the heterocyclic nitrogen atom a reactive group which can be used in cyanine dye condensations, such as alpha methyl benzothiazole or alpha methylmercapto quinoline, with a bifunctional organic hydrocarbon compound containing two functional groups, each of which is capable of forming quaternary ammonium salts with ternary nitrogen compounds.

The bis salts have the general formula:

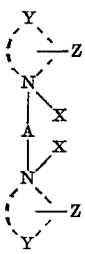
(2)

wherein A is a bivalent hydrocarbon radical joined to the N atoms as shown through aliphatic carbon, Y constitutes the atoms necessary to complete a heterocyclic nitrogen nucleus of the type contained in cyanine dyes, Z is a reactive methyl or hydrocarbon mercapto group or a halogen atom capable of dye condensation and both of the nitrogen atoms shown are pentavalent and have attached thereto an acid radical. For instance, Y may constitute the atoms necessary to complete an azole radical, such as a thiazole, oxazole, selenazole or iminazole; an indolenine, dialkylindolenine, or pyridine radical including those having fused carboxylic rings, e. g., benzothiazoles, quinolines, etc.

In accordance with a preferred aspect of the invention two bis salts of the formulae:

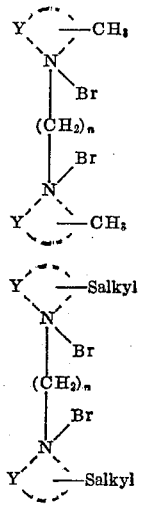
(3)

(4)

where Y has the same significance as in Formula 2, the alkyl radicals contain from 1 to 2 carbon atoms being methyl or ethyl radicals and the reactive methyl and alkyl mercapto groups are in the alpha or gamma position to the heterocyclic nitrogen atoms and $n$ is a positive integer from 1 to 6.

A novel class of polymeric pseudocyanine dyes, which constitutes the preferred aspect of the invention, can be made by reacting one mol of N,N'-ethylene-bis-(2-methylmercaptoquinoline)-dibromide with one mol of N,N'-ethylene-bis-(2-methylbenzothiazole)-dibromide in the presence of an acid binding agent, e. g., piperidine, dimethylamine, trimethylamine, etc.

The polymeric bis-type cyanine dyes and those having recurring cyanine dye nuclei are particularly useful in the preparation of spectrally sensitized photographic silver halide emulsions. They are not limited in their use to any particular silver salt but actually can be used with simple and mixed silver halide emulsions and mixed emulsions in general. They have utility in silver chloride, silver bromide, silver-chloride-bromide, silver-bromide-iodide, silver-chloride-bromide-iodide, etc., colloid emulsions. They are also useful in mixed emulsions, for instance, those having the proportion of 25% chloride emulsions to 75% chlorobromide emulsion to 75% chloride emulsion to 25% chlorobromide emulsion. The dyes can be added to one or more of such emulsions prior to mixing.

In the preparation of photographic emulsions containing such novel dyes, it is necessary only to bring the dye into intimate contact with the light-sensitive silver salt grains whereby they become dyed or absorb or adsorb the dye. This can be accomplished by dispersing the compounds in the emulsions before coating to form light-sensitive layers or after coating by bathing or impregnating the layer with the polymeric dyes. It is convenient to add the dyes to the emulsions in the form of solutions in appropriate solvents. The solvent must, of course, be compatible with the emulsion, substantially free from any deleterious effect on the light-sensitive materials in the emulsions, and capable of dissolving the dyes. Methanol is a satisfactory solvent for my new dyes. Ethanol or acetone can be employed. The dyes are advantageously incorporated in the finished washed emulsions and should be uniformly distributed throughout the emulsions.

The concentration of the new dyes in the photographic emulsions can vary widely, a practical range being from about 2 to 100 mg. per liter of ordinary flowable colloid silver halide emulsion. The concentration of dye will vary according to the type of light-sensitive materials employed in the emulsion and according to the effects desired. The suitable and most economical concentration for any given emulsion will be apparent to those skilled in the art upon making ordinary tests and observations customarily employed in the art of emulsion making. To prepare a gelatino-silver halide emulsion, the following procedure is satisfactory: A quantity of the dye is dissolved in methyl alcohol, ethyl alcohol, or acetone and a volume of this solution (which may be diluted with water) containing from 2 to 100 mg. of dye is slowly added to 100 cc. of a flowable gelatino-silver halide emulsion with stirring. Stirring is continued until the dye is thoroughly incorporated in the emulsion. Ordinarily from 10 to 20 mg. of the new dyes per liter of emulsion suffice to produce the maximum sensitizing effect.

The invention will be more fully illustrated but is not intended to be limited by the following examples:

*Example I*

Nine grams of 2-methylmercaptoquinoline and 4.7 grams of ethylenedibromide were heated in a sealed tube in a steam bath for 48 hours. The resulting bis-heterocyclic quaternary salt was a white solid. It was dissolved in alcohol heated to about 70° C. and enough ether added to produce a slight precipitate. On chilling in a salt-ice bath, N,N'-diethylene-bis-(2-methyl-mercaptoquinolinium)-dibromide of the formula

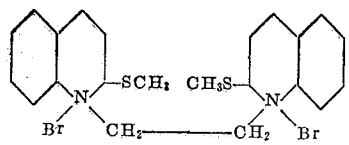

which crystallized as a white powder, was formed. It had a melting point of 218° to 223° C. It was filtered and dried in a vacuum desiccator.

By substituting trimethylenedibromide, tetramethylenedibromide, pentamethylenedibromide, hexamethylenedibromide in similar molar proportions for the ethylene dibromide, the following compounds were made:

1. Trimethylene-bis-(2 - methylmercaptoquinolinium)-dibromide—melting point 194°–198° C.—tan powder.
2. Tetramethylene - bis - (2 - methylmercaptoquinolinium)-dibromide—182° C.—tan powder.
3. Pentamethylene-bis - (2 - methylmercaptoquinolinium)-dibromide—191° C.—white powder.

Similarly by substituting hexamethylene-dibromide and 2-5-dimethylselenazole for the reactants of Example I, the compound hexamethylene-bis-(2-5 - dimethylbenzoselenazole) - dibromide was made. The mono-methylene-bis compound can be made in like manner with methylene bromide.

*Example II*

Figure 2:
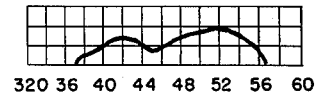

One mol of N,N'-hexamethylene-bis-(2-methylmercaptoquinolinium)-dibromide was reacted with one mol of N,N'-hexamethylene-bis-(1-methylbenzothiazole)-dibromide by dissolving the compounds in absolute ethyl alcohol as a solvent medium and trimethylamine as the acid binding agent. It was heated under reflux for one and one-half hours and then recrystallized from methanol. The polymeric (1',1'''-hexamethylene-bis-3,3'' - hexamethylene - bis - thiapseudocyanine)-polybromide obtained was a red colored dye and had a melting point of 257° to 297° C. and contained a structure of the formula:

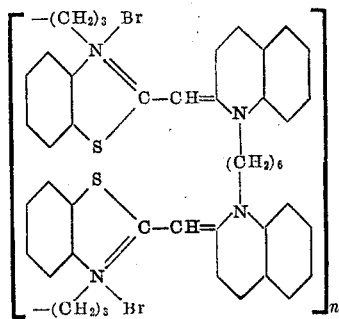

wherein $n$ is a positive integer, e. g., 1, 2, 3, 4, etc. When added to an emulsion as stated in Example II it extended the sensitivity to 5500Å. with a maximum at 4800Å. shown in Figure 1 of the drawing. When added in like manner to a silver chloride emulsion it extended its sensitivity as shown in Figure 2 of the drawing.

Similar dyes can be made by substituting for the first reactant of this example a mol of each of the following compounds: N,N'-dimethylene-bis-(2-methylmercaptoquinolinium) -dibromide, N,N'-trimethylene-bis-(2 - methylmercaptoquinolinium) -dibromide, N,N'-tetramethylene-bis-(2-methylmercaptoquinolinium)-dibromide, N,N'-pentamethylene-bis-(2 - methylmercaptoquinolinium)-dibromide.

While nearly all of the above examples are concerned with the preparation of polymeric polymethylene-bis-cyanine dyes and especially polymeric polymethylene-bis-dyes of the pseudocyanine class, the invention is not limited to that preferred class of compounds. On the contrary, various other hydrocarbon nuclei may be present as the bridging radical between the heterocyclic nitrogen atoms of the heterocyclic nitrogen nuclei in place of the polymethylene radical as has been taught above and in application Serial Number 409,433. Moreover, other heterocyclic nitrogen nuclei may be used. Thus, in place of the 2-methylmercaptoquinoline of Example I, there can be substituted other heterocyclic nitrogen bases having reactive groups to form bis salts. Suitable specific bases include alpha-picoline, gamma-picoline, 2,6-lutidine, 2,4-lutidine, 2,5-lutidine, 2-methylbenzoxazole, 2-methyl-beta-naphthoxazole, 2 - methylbenzoselenazole, 2 - methyl-beta-naphthothiazole, 1-methyl-alpha-naphthothiazole, 2-methylthiazole, 2-methyloxazole, 2-methyl - 6-aminobenzothiazole, 2 - methyl - 5 - amino benzothiazole, 2,6 - dimethyl - 5 - aminobenzothiazole, 2,4-dimethyl-6-aminobenzothiazole, 2,4,6-trimethyl-7-aminobenzothiazole, 2-methyl-6-diethylaminobenzothiazole, 2-methyl-5-dimethylaminobenzothiazole, 2,4-dimethyl-6-phenylaminobenzothiazole, 2-methyl-6-acetylaminobenzothiazole, 2,4,6-trimethyl-7-acetylaminobenzothiazole, 2,5-dimethyl-4-acetylthiazole, 2,5-dimethyl-4-benzoylthiazole, 2,5-dimethyl-4-picolinyl thiazole, 2,5-dimethyl-4-thiazole carboxyanilide, 2-methyl-5-(2-pyridyl)-4-thiazole, carboxyanilide, ethyl-2,5-dimethyl-4-thiazole carboxylate, 2-methyl-4-furylthiazole, 2-methyl-4-thienyl thiazole, 2-methyl-4-(2-pyridyl)thiazole, and the corresponding oxazoles and selenazoles, 2-methyl-5-ethoxy benzthiazole, 2,5,5-trimethyl-benzselenazole, 2-methyl-5:6-dimethoxy-benz-thiazole, 2-methyl-5-methoxy-selenazole, 2-methyl-6-ethoxy-benzthiazole, 5:6-benzthiazole, alpha-methyl-4:5-methylenedioxy-benz-thiazole, lepidine, 6-methyllepidine, 1,3,3-trimethyl-2-methylene indoline, N-ethyl-e-methylenedihydroquinoline, N-ethyl-6,7-dimethyl-2-methylene-dihydroquinoline, N-methyl-6-chloro-2-methylenedihydroquinoline, 1,3,4-trimethyl-2-methylene naphthindoline, 2-methyl thiazoline, 2-methyl selenazoline, 2,6-dimethyl pyridine, 2,6-dipropyl pyridine, 2-methyl-6-ethyl pyridine, 2,4,6-trimethyl pyridine, 2,6-dimethyl-4-phenyl pyridine, and 2,6-dimethyl-4-benzylpyridine.

Similarly, in place of the polymethylene bromides of the above examples, there can be substituted other polyfunctional hydrocarbon derivatives capable of forming bis, tris, etc., salts. Useful compounds include the following:

A. Polyhalogen substituted alkanes, such as methylene dibromide, methylene chloride, propylene dibromide-1,2-butylene dichloride ethylene and propylene di-iodides, isobutyl dibromide, tri - iodo - triethylmethane, 1,1 - dibromoethane, bromoform, acetylene-tetrabromide, hexabromethane, and aromatic substituted alkanes, e. g., benzylidine-dichloride, omega, omega'-xylylene-dibromide, omega, omega'-xylylenedichloride, cyclohexane dibromide-1,2,-1,3, and -1,4, 1,3-dibromo-2-hydroxy-propane, etc.

B. Alkyl esters of alkylene and cycloalkylene sulfonic acids, such as methane disulfonic dimethyl ester, ethane and alpha-beta disulfonic diethyl ester, ethane alpha : alpha disulfonic dimethyl ester, the diethyl ester of ethane alpha: beta disulfonic acid, alpha : beta propane disulfonic diethyl ester, beta-methyl propane alpha : beta disulfonic dimethyl ester, the diethyl ester of n-hexane-, n-haptane-, and n-octane disulfonic acids, methane trisulfonic triethyl ester, ethane alpha:alpha:beta trisulfonic triethyl ester, propane alpha:beta:gamma trisulfonic triethyl ester, etc.

C. Alkyl esters of arylene sulfonic acids, such as the diethyl ester of phenyl disulfonic acid, the dimethyl ester of naphthalene disulfonic acid, the dimethyl ester of diphenyl disulfonic acid, the triethyl ester of phenyl trisulfonic acid.

D. Various alkyl disulfates, such as dimethyl alpha:beta ethane disulfate, diethyl alpha:beta ethane disulfate, etc.

E. Esters of sulfonic acids with polyhydric alcohols, e. g., the alkyl, cycloalkyl, and aryl sulfonic acid esters with glycerol and the glycols. Suitable esters include:

Ethylene di-(ethyl sulfonate),
Ethylene di-(p-toluene sulfonate),
Ethylene di-(cyclohexyl sulfonate),
p-Phenylene di-(p-toluene sulfonate),
Propylene di-(p-toluene sulfonate), and
Hexamethylene di-(p-toluene sulfonate).

F. Mixed compounds derived from combining functional aspects of A, B, C, D, and E, such as the alpha bromo, beta ethyl sulfonates of ethane.

It is apparent from the above that the hydrocarbon linking radical may be substituted by various groups which do not form ternary salts, e. g., nitro, primary, secondary, and tertiary amino groups; hydroxyl, carbonyl, thiocarbonyl, heterocyclic, and hydrocarbon groups.

In like manner, one of the above bis-cycloammonium salts can be reacted with another different bis-cycloammonium salt to form polymeric bis-cyanine dyes similar to that of Example II. By merely varying one of the bis salts of that example, a number of similar polymeric bis dyes can be made. When both bis salts are varied, a large number of such dyes can be obtained.

The products of this invention are useful in photography particularly as sensitizing dyes employed to extend the spectral sensitivity of gelatino-silver halide emulsions in the manner known to the art. More specifically, they are particularly useful as sensitizing dyes for use in elements having two emulsion layers with markedly different gradations which are selectively sensitized to different regions of the spectrum. In addition, the compounds are useful in color photography for the preparation of bleaching out layers in which the dyes are unstabilized to light and can be bleached to form colored pictures by one or more of the processes known to the art. The products are also useful in the preparation of colored filter or screening layers both for photography and other fields of optical science.

The novel polymeric dyes can be used in conjunction with emulsion hardening agents, emulsion desensitizers, surface modifiers, fog inhibiting agents, etc., and monomeric sensitizing dyes of the cyanine, carbocyanine, merocyanine, neocyanine, styryl, etc., dyes.

One advantage of the invention is that it permits the adsorption of sensitizing dye molecules on silver halide grains in multi-molecular layers of controllable depth and configuration. Of comparable advantage is the fact that the invention provides a series of cyanine-type sensitizing dyes which are "non-wandering" or substantially non-diffusible through the hydrophilic colloids, such as gelatin, which comprise the binding materials of silver halide emulsions. True, non-wandering sensitizing dyes permit mixed halide emulsions to be prepared having outstanding properties for sharply recording individual spectral bands. A further advantage is that the invention permits the preparation of photographic layers from self-binding dye materials which form cohesive, resistant films suitable for light-sensitive silver halide layers, bleachable dye layers, or filter layers. A still further advantage is that the invention provides dyes of the cyanine class substantive to materials which normally could not be dyed. Another advantage resides in the fact that the invention makes possible the preparation of highly colored films, foils, filaments and plastics in which the dye molecule is an integral part of the synthetic material.

The subject matter of the present application has been divided out of copending application Serial Number 487,849, filed May 21, 1943, now U. S. Patent 2,425,773 and is a continuation-in-part of said application.

As many apparently widely different embodiments of this invention may be made without departing from the spirit and scope thereof, it is to be understood that the invention is not to be limited except as defined by the appended claims.

What is claimed is:

1. The process which comprises condensing a hydrocarbon bis-heterocyclic quaternary nitrogen salt which contains a reactive methyl group in one of the positions alpha and gamma to each heterocyclic nitrogen atom and has the formula

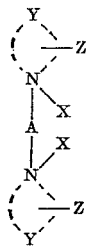

wherein A is a bivalent hydrocarbon radical joined to the nitrogen atoms through an aliphatic carbon atom, Z is the reactive methyl group, X is the negative radical of an acid and Y constitutes the atoms necessary to complete a heterocyclic nitrogen nucleus of the type usual in cyanine dyes, with a similar bis-heterocyclic nitrogen quaternary salt which contains a reactive group taken from the class consisting of reactive halogen atoms and reactive hydrocarbon mercapto groups in one of the positions alpha and gamma to the heterocyclic nitrogen atom and has the formula

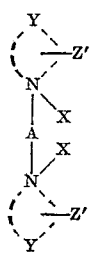

wherein A, X and Y have the same significance as in the first formula and Z' is said latter reactive group, and recovering a polymeric cyanine dye.

2. A process as set forth in claim 1 wherein the condensation is carried out in a solvent medium in the presence of an acid binding agent.

3. The process which comprises condensing a hydrocarbon bis-heterocyclic quaternary nitrogen salt which contains a reactive methyl group in one of the positions alpha and gamma to each heterocyclic nitrogen atom and has the formula

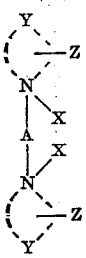

wherein A is a bivalent hydrocarbon radical joined to the nitrogen atoms through an aliphatic carbon atom, Z is the reactive methyl group, X is the negative radical of an acid and Y constitutes the atoms necessary to complete a heterocyclic nitrogen nucleus of the type usual in cyanine dyes, with a similar bis-heterocyclic nitrogen quaternary salt which has a similar structural formula except that the reactive group is a hydrocarbon-mercapto group, by heating a mixture of the two bis salts in a solvent medium in the presence of an acid binding agent, and recovering a polymeric cyanine dye.

4. A process as set forth in claim 3 wherein said solvent medium is an acid binding solvent.

5. The process which comprises condensing a hydrocarbon bis-heterocyclic quaternary nitrogen salt which contains a reactive methyl group in one of the positions alpha and gamma to each heterocyclic nitrogen atom and has the formula

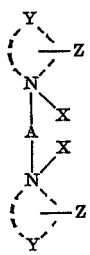

wherein A is a bivalent hydrocarbon radical joined to the nitrogen atoms through an aliphatic carbon atom, Z is the reactive methyl group, X is the negative radical of an acid and Y constitutes the atoms necessary to complete a heterocyclic nitrogen nucleus of the type usual in cyanine dyes, with a similar bis-heterocyclic nitrogen quaternary salt which has a similar structural formula except that the reactive group is a methylmercapto group by heating a mixture of the two bis salts in a solvent medium in the presence of an acid binding agent, and recovering a polymeric cyanine dye.

6. The process which comprises reacting two hydrocarbon bis salts of the formulae

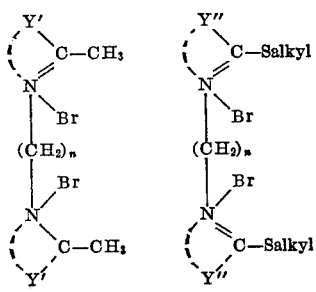

where Y' constitutes the atoms necessary to complete a pyridine ring and a quinoline radical, Y'' constitutes the atoms necessary to complete an azole radical, alkyl contains from 1 to 2 carbon atoms, and $n$ is a positive integer of 1 to 6, by heating a mixture of the two salts in a solvent medium and recovering a polymeric cyanine dye.

7. The process which comprises reacting N,N'-hexamethylene - bis - (2 - methylmercaptoquinolinium)-dibromide of the formula

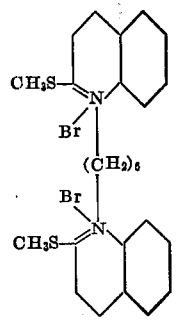

with N,N' - hexamethylene - bis-(1-methylbenzothiazole)-dibromide of the formula

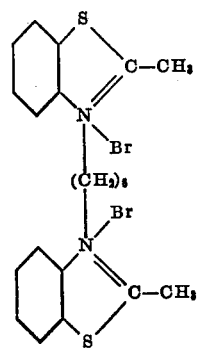

in a solvent medium by heating the mixture in the presence of an acid binding agent.

8. The polymeric cyanine dyes obtained by the process of claim 1 which contains the units of the probable formula

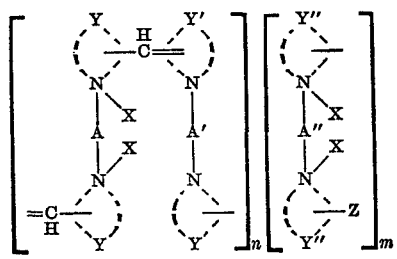

wherein A, A' and A'' are bivalent hydrocarbon radicals which are joined to the N-atoms through an aliphatic carbon atom, Y, Y' and Y'' constitute the atoms necessary to complete the atoms usual in cyanine dyes, the radical Y'' being the same as one of the radicals Y and Y', X is a negative radical of an acid, $n$ is a small positive integer and $m$ is a number taken from the group consisting of 0 and 2, and Z is taken from the group consisting of methyl and hydrocarbon-mercapto groups.

9. The polymeric cyanine dyes obtained by the process of claim 6 which contain the units of the probable formula:

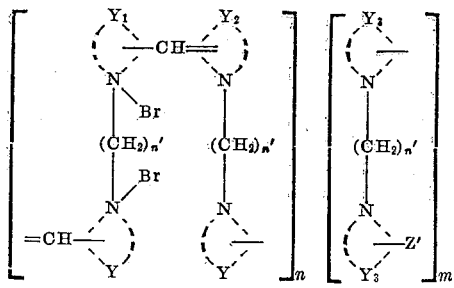

wherein one of the member $Y_1$ and $Y_2$ constitute the atoms necessary to complete a quinoline radical and the other constitutes the atoms necessary to complete an azole radical, $Z'$ is taken from the group consisting of methyl and alkylmercapto radicals of 1 to 2 carbon atoms, $n$ is a small positive integer, $n'$ is a positive number of 1 to 6 and $m$ is taken from the group consisting of 0 and 2.

10. The polymeric cyanine dyes obtained by the process of claim 7 which contain units of the probable formula

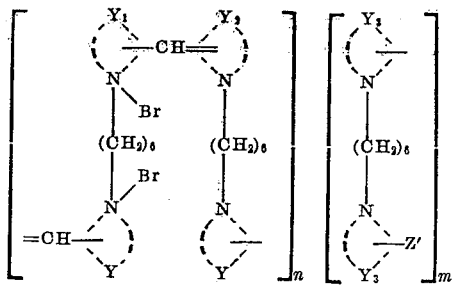

wherein one of the members $Y_1$ and $Y_2$ constitute the atoms necessary to complete a quinoline radical and the other constitutes the atoms necessary to complete a benzthiazole radical, $Z'$ is taken from the group consisting of methyl and methylmercapto radicals, $n$ is a small positive integer, and $m$ is taken from the group consisting of 0 and 2.

CYRIL D. WILSON.

No references cited.